United States Patent [19]

Berkovich

[11] Patent Number: 5,369,755
[45] Date of Patent: Nov. 29, 1994

[54] COMPUTER COMMUNICATION BUS SYSTEM USING MULTIPLE CONTENT INDUCED TRANSACTION OVERLAP (CITO) COMMUNICATION CHANNELS

[75] Inventor: Semyon Berkovich, Rockville, Md.

[73] Assignee: AlliedSignal Inc., Morris Township, Morris County, N.J.

[21] Appl. No.: 941,614

[22] Filed: Sep. 8, 1992

[51] Int. Cl.$^5$ .............................................. H04J 3/00
[52] U.S. Cl. ............................ 395/500; 364/DIG. 1; 364/DIG. 2
[58] Field of Search ............. 364/DIG. 1 MS File, 364/DIG. 2 MS File, ; 395/200, 250, 275, 325, 500, 600, 800; 370/110.1, 110.4, 118, 85.1, 100.1, 67, 107, 59, 122, 27; 348/409

[56] References Cited

U.S. PATENT DOCUMENTS

| | | | |
|---|---|---|---|
| 4,493,074 | 1/1985 | Walter et al. | 370/119 |
| 4,598,411 | 7/1986 | Berkovich et al. | 375/27 |
| 4,855,997 | 8/1989 | Wilson et al. | 370/85 |
| 4,868,814 | 9/1989 | Berkovich et al. | 370/67 |
| 5,095,481 | 3/1992 | Berkovich | 370/100.1 |

Primary Examiner—Robert B. Harrell
Attorney, Agent, or Firm—Howard G. Massung

[57] ABSTRACT

A computer communication bus system having a communication bus (10) having a plurality of data transmission lines (26, 28, 30) and a plurality of transmission nodes (12, 14, 16, 18) connected to the communication bus (10). Each transmission node (12, 14, 16, 18) has a data source providing multi-bit data to be transmitted on the communication bus (10), a plurality of data transformers (42, 44, 46) for encoding or transforming the multi-bit data into different multi-bit encoded data formats, and a plurality of CITO transmitters for transmitting the transformed data on different data transmission lines (26, 28, 30) using a content induced transaction overlap (CITO) protocol. Using the CITO protocol, the CITO transmitters (20, 22, 24) transmit the same data on each of the transmission lines (26, 28, 30) in a different order.

12 Claims, 3 Drawing Sheets

| TRANSMISSION NODE | INITIAL DATA | INVERTED DATA | TRANSFORMED DATA (+010) |
|---|---|---|---|
| 12 | 000 (1) | 111 (4) | 010 (2) |
| 14 | 010 (2) | 101 (3) | 000 (1) |
| 16 | 101 (3) | 010 (2) | 111 (4) |
| 18 | 110 (4) | 001 (1) | 101 (3) | ent multi-bit data encodings on one of the at least two
COMPUTER COMMUNICATION BUS SYSTEM USING MULTIPLE CONTENT INDUCED TRANSACTION OVERLAP (CITO) COMMUNICATION CHANNELS

TECHNICAL FIELD

The invention is related to the field of computer communication bus systems and in particular to a computer communication bus system using multiple CITO channels.

BACKGROUND ART

Most distributed computer systems operate in a bit-serial manner. To increase the data throughput, the information may be transmitted in a bit-parallel manner where the data is transmitted in bytes using eight or more parallel transmission lines. However, these buses are complicated and difficult to control in a distributed computer system.

Since the introduction of the content induced transaction overlap (CITO) concept, different variations of the CITO concept have been considered to speed up the transmission process. The CITO concept was initially disclosed by Walter et al in U.S. Pat. No. 4,493,074. The CITO concept has been subsequently expanded by Berkovich et al in U.S. Pat. No. 4,598,411 to on-the-fly data compression, and by Wilson et al in U.S. Pat. No. 4,855,997 to a priority querying technique for a CITO communication system. Berkovich et al, in U.S. Pat. No. 4,868,814, has expanded the CITO concept to multi-level concurrent communications architecture for multiprocessor computer systems and a synchronization technique in U.S. Pat. No. 5,095,481.

The CITO multi-access communication protocol has evolved from the process of bit-overlapping transmission. This process develops bit-by-bit in an established time slot framework. After sending a bit, each transmitter listens to the signal state of the transmission line, commonly referred to as the CITO channel. The signal state of the CITO channel is determined by overlapping its own signal with those of other CITO transmitters. The signal state of the CITO channel is then compared with the signal state of the bit presented for transmission. If the signal state of the bit presented for transmission is different from the signal state of the CITO channel signifying a conflict, the CITO transmitter will suspend further transmissions and wait for another opportunity to resume transmission. The CITO protocol allows the transmissions by the suspended CITO transmitters to be resumed from the point where they were suspended. This is accomplished by a "bit-competition" process in which each suspended transmitter transmits a number corresponding to the number of bits remaining to be transmitted. The CITO transmitters having the least number of bits remaining to be transmitted will then transmit their remaining bits. The data stream on the CITO channel interleaves data bit fragments with bit position data. Each data word arriving through a CITO channel is reconstructed by substituting a received trailing fragment for a corresponding rear portion of the previously received word. The overlapping transmission using CITO protocol is not only an efficient conflict-free communication process but also is a procedure which incorporates properties of associative processing.

SUMMARY OF THE INVENTION

The invention is a computer communication bus system having a communication bus and a plurality of transmission nodes connected to the computer bus. The communication bus has at least two parallel transmission lines and each transmission node has a data source for providing multi-bit data to be transmitted on the communication bus, means for transforming the multi-bit data into at least two different multi-bit data encodings, and a plurality of CITO transmitters for transmitting the multi-bit data on a first of the at least two different multi-bit data encodings on one of the at least two transmission lines and for transmitting the second of the at least two different multi-bit data encodings on the other of the at least two data transmission lines.

In a practical application, the communication bus may have a plurality of parallel transmission lines and each transmission node will transform the multi-bit data into an equal number of different multi-bit data encoded formats with each multi-bit data encoded format being transmitted on a different one of the parallel transmission lines using the CITO protocol.

The individual transmitting nodes may also have CITO receivers connected to each of the transmission lines so that each transmission node may also receive the data being transmitted. Effectively, each transmission node may act as a transceiver. In the preferred embodiment, the communication bus system forms a communication network for a distributed processing system in which each node is capable of transmitting and receiving data from every other node connected to the communication bus system.

One advantage of the communication bus system is the data compression resulting from the CITO protocol and that by using different encoded data formats, the transmission of the data may be apportioned among the different transmission lines.

Another advantage of the communication bus system is that by virtue of the content addressable prioritization, the same data will be transmitted on the different transmission lines in a different order and will be automatically distributed over the different CITO channels in a near optimal manner.

Still another advantage is that the communication bus system having a plurality of CITO channels is intrinsically fault tolerant with graceful degradation. If one CITO channel fails, the remaining CITO channels will redistribute the data transmission in a near optimal way.

These and other advantages of the communication bus system having a plurality of CITO channels working in parallel will become more apparent from a reading of the specification in conjunction with the drawings.

DETAILED DESCRIPTION OF THE INVENTION

Figure 1:
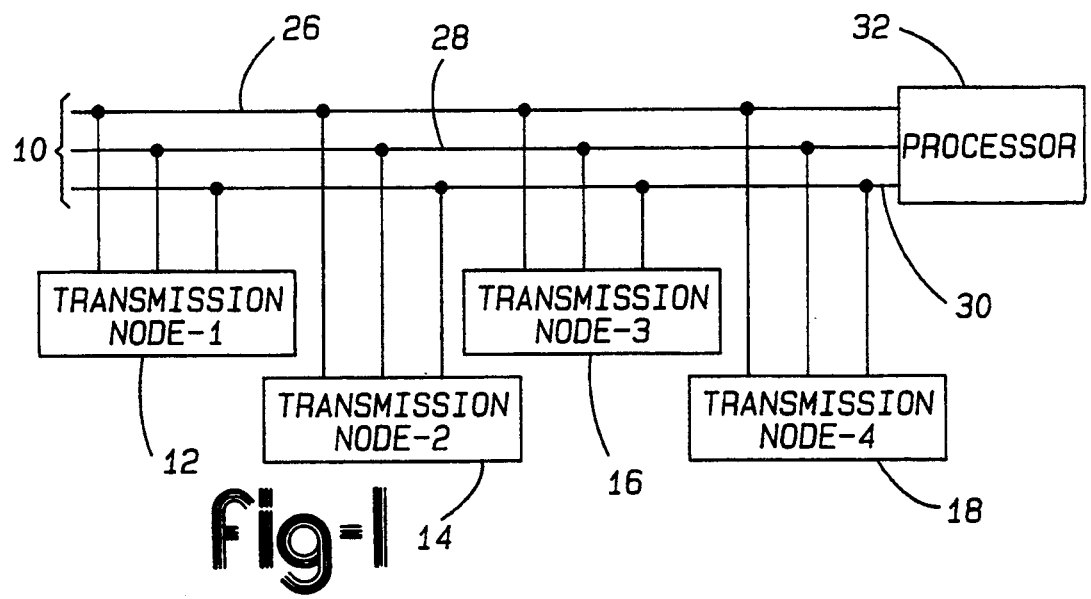
FIG. 1 is a block diagram of the communication bus system having a plurality of transmission nodes.
Figure 2:
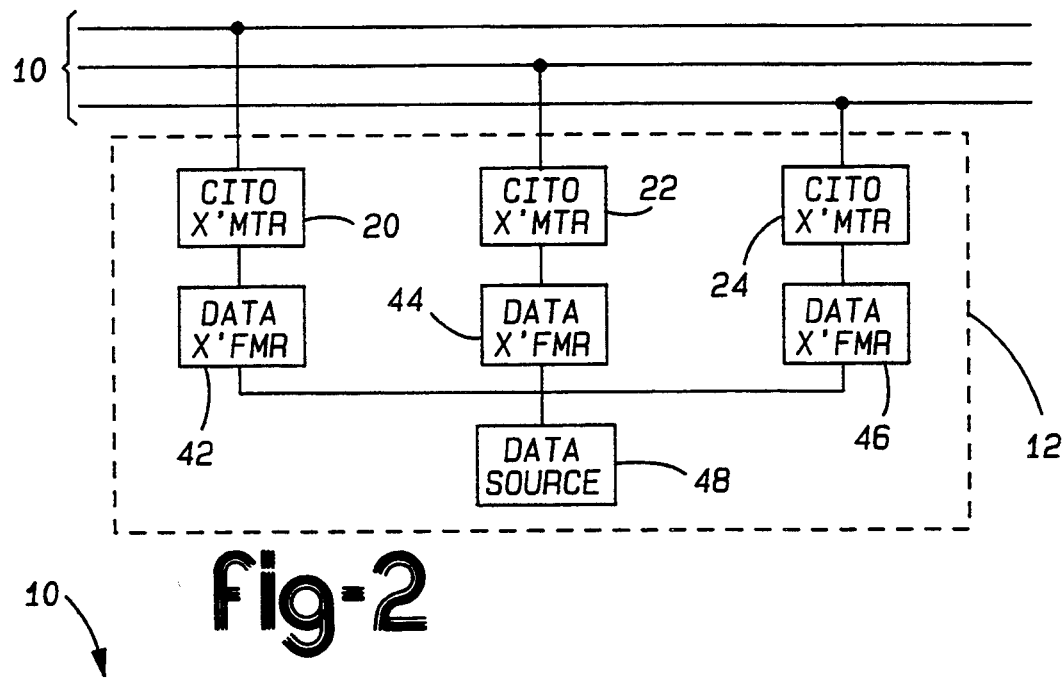
FIG. 2 is a block diagram showing the major components of each transmission node.

FIG. 1 is a block diagram of a computer communication bus system using multiple CITO channels. In the illustrated embodiment, the communication bus system has four Transmission Nodes 12, 14, 16 and 18 connected to a communication bus 10. Each Transmission Node 12, 14, 16 and 18 has a plurality of Content Induced Transmission Overlap (CITO)) transmitters 20, 22 and 24 as shown in FIG. 2. The structure of Transmission Nodes 12, 14, 16 and 18 are substantially the same, therefore, only Transmission Node 12 will be discussed in detail. While in the illustrated embodiment shown in FIG. 1, the communication bus 10, has only three parallel transmission lines 26, 28 and 30, and only four Transmission Nodes 12, 14, 16 and 18, it is to be understood that in practical system the communication bus 10 may have more than three transmission lines and that more than four Transmission Nodes may be connected to the communication bus. The reduced number of transmission lines and Transmission Nodes in the embodiment shown in FIG. 1 is only used to simplify the explanation of the invention.

Figure 3:
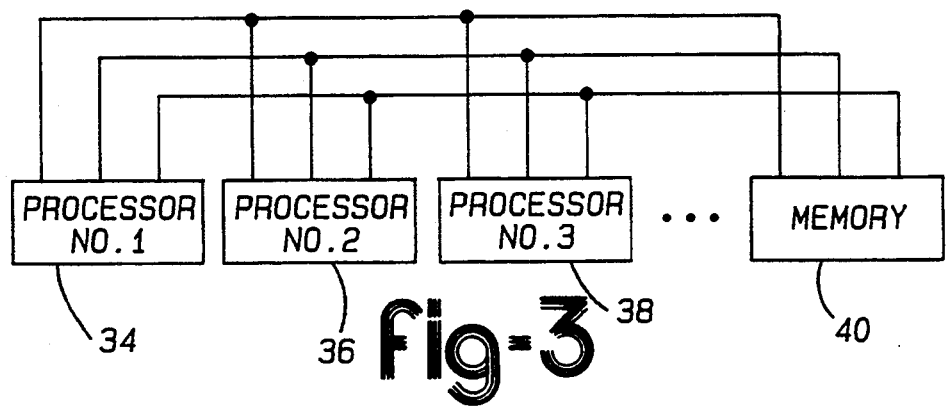
FIG. 3 is a distributed processing system using the communication bus system.
Figure 6:
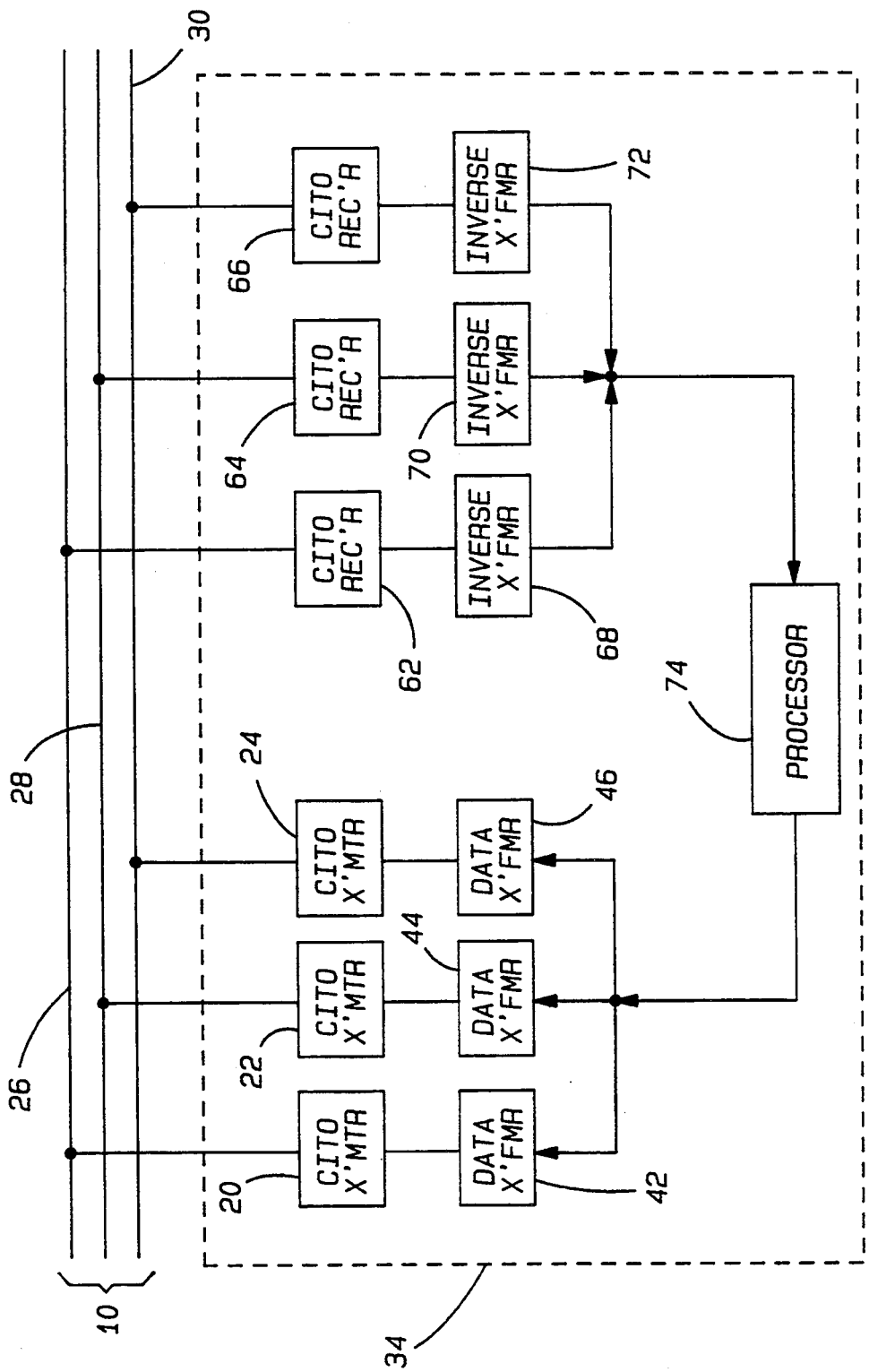
FIG. 6 is a block diagram showing the major components of each processor shown in FIG. 3.

As further shown in FIG. 1, the communication bus 10 may also be connected to an associated Receiver 32. However, the communication bus 10 may interconnect a plurality of processors, such as Processors 34, 36 and 38 as shown in FIG. 3. In particular, the embodiment of FIG. 3 may be a distributed processing system and may include one or more memories such as memory 40 as is known in the art. Referring now to FIG. 6, each of the processors 34 through 38 and the memory 40 has a plurality of associated CITO transmitters such as CITO transmitters 20, 22 and 24, shown in FIG. 2. Each of the CITO transmitters is connected to a respective one of the transmission lines of the communication bus 10. In a like manner, each Processor 34, 36 and 38 will also include a plurality of CITO receivers 62, 64, 66, which receive the data transmitted on each line of the communication bus 10 and restores the data to its transformed format using the CITO protocol as described in the prior art. The received data is inversely transformed to its original format using inverse transformers 68, 70, 72. The inverse transformed data is transmitted to an associated processor 74 as shown.

Returning to FIG. 2, each CITO transmitter 20, 22 and 24 receives multi-bit data from an associated data transformer 42, 44, and 46 which transforms or encodes the multi-bit data received from a common data source 48 into different encoded data formats. The common data source 48 may be a sensor, a memory, a microprocessor or any other type of data storage or generating device known in the art. The multi-bit data output from the data source 48 is transformed (encoded) by the associated data transformers 42, 44 and 46 in different ways such that when transmitted by their respective CITO transmitters will be transmitted to the Processor 32 in a different order.

To ensure correct decoding of the transmitted multi-bit data, the data transformers 42, 44 and 46 employ reversible data transformations. The choice of an appropriate transformation is determined by the requirements of simplicity and possibly of some information processing benefits. For example, the transformation may permit maximum and minimum data values or a predetermined data value to be the first transmitted.

Figures 4, 5:
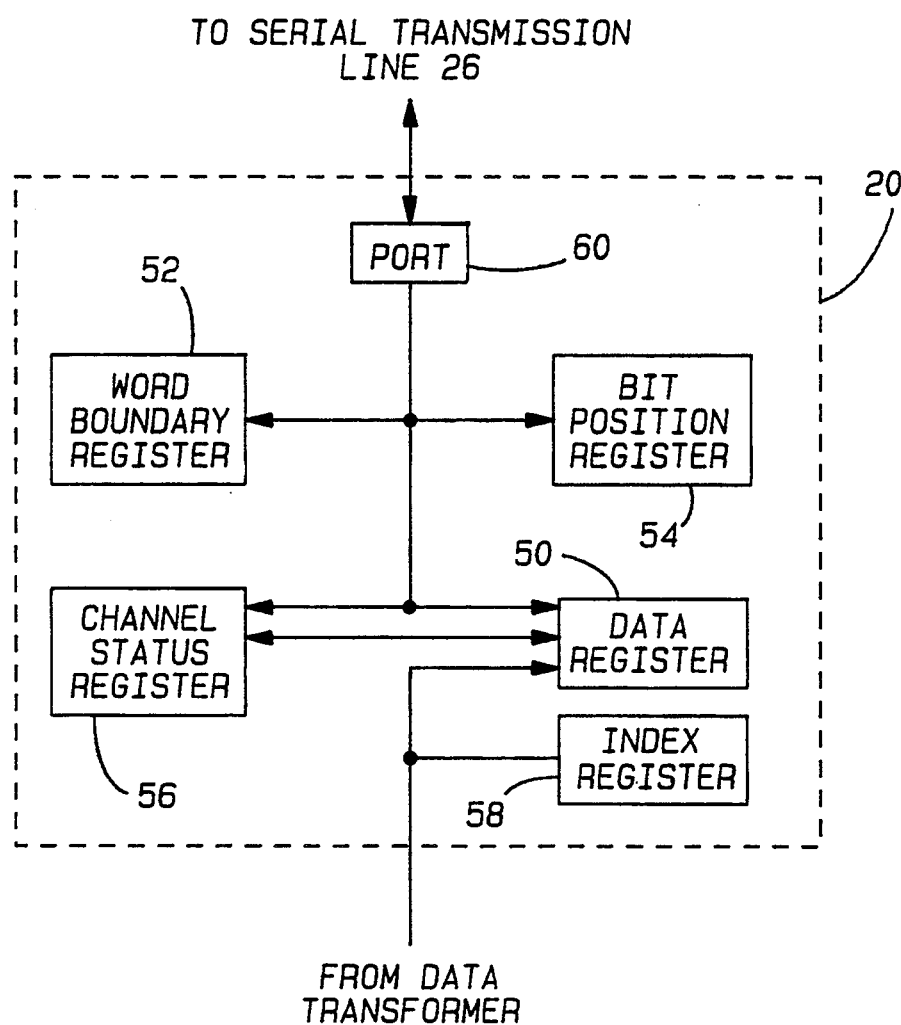
FIG. 4 is a table listing the data in different transformed formats.
FIG. 5 is a block diagram showing the major components of each CITO transmitter.

In addition to ordinary direct and inverse data transformations, a variety of other useful transformations can be performed by adding to the data a predetermined bit string by modulo 2. FIG. 4 shows an example of a set of multi-bit data as presented to the data transformers 42, 44 and 46 by the data source, the same data after being inverted by one of the data transformers 42, 44 and 46 and the same data transformed by a predetermined transformational bit string 010.

The CITO protocol, as is known in the art, will first complete the transmission of the lexicographically smallest data value. In the three sets of data shown on FIG. 4, the initial set of data, the inverted set of data, and the transformed set of data, the lexicographical ordering of the data is shown in parenthesis along side each data value in each set where (1) is the data value having the smallest lexicographical value and (4) has the highest lexicographical value.

The structure and operation of the CITO transmitters 20, 22 and 24 shall be discussed relative to the block diagram shown on FIG. 5. Since the CITO transmitters are substantially the same, only CITO transmitter 20 will be discussed in detail. The CITO transmitter 20 has a data register 50 for storing the multi-bit data or word to be transmitted to the bus 10, a word boundary register 52 for storing the length (number of bits) of the multi-bit data to be transmitted and a bit position register 54 storing the number of bits which remain to be transmitted. The CITO transmitter 20 also has a line status register 56 which compares the content of the data register 50 at a particular bit position with the binary signal level on the associated transmission line of the communication bus 10 to which the CITO transmitter 20 is connected. The pointer register 58 is pointing to the data bit in the data register 50 which is the next data bit to be transmitted. A ebi-directional port 60 couples the CITO transmitter to the associated transmission line in this case, line 26, of communication bus 10. The bi-directional port 60 presents the data stored in the data register 50 one bit at a time and communicates to the line status register 56 the state of the transmission line.

The CITO transmitters produce communication messages operating autonomously according to CITO protocol taught by the prior art. The following is a brief description of the CITO protocol. The bit position register 54 and the word boundary register 52 are initially loaded with the length (number of bits) of the multi-bit data or word stored in the data register 50. After submitting (transmitting) a data bit from the data register 50 to the associated transmission line, the line status register 56 compares the state of the bit submitted with the state of the associated transmission line of the communication bus 10. If the line status register 56 detects a conflict, i.e., a one (1) bit is submitted by the CITO transmitter but the line status register 56 detects that a zero (0) bit exists on the associated transmission line of the communication bus 10, it means that the submitted one (1) bit was not transmitted. Upon the detection of a conflict, the CITO transmitter terminates its transmission and waits for a subsequent bit competition as shall be discussed hereinafter. If the line status register 56 does not detect a conflict, it means the submitted data bit was successfully transmitted and, therefore, the bit position register 54 and the word boundary register 52 are decremented and the next bit is submitted for transmission. This process continues until either all of the bits in the data register 50 are transmitted or a conflict is detected. The word boundary register 52 is always decremented each time a bit is transmitted on the associated transmission line of the communication bus 10 even after the CITO transmitter terminates its transmission after a conflict is detected.

The decrementation of the word boundary register 52 to zero signifies at least one CITO transmitter has successfully transmitted the entire content of its data register 50. Each CITO transmitter whose bit position register reaches zero and has successfully transmitted all of its data, terminates all further attempts to transmit on the communication line. CITO transmitters whose bit position registers are not zero when the word boundary register 52 is decremented to a zero value, enters a "bit competition" process in which they transmit the numerical content of their bit position registers are transmitted on the associated transmission line. As the lexicographically smallest bit position value is being transmitted on the associated transmission line of the bus 10, each CITO transmitter connected to the associated transmission line of the communication bus 10 shifts the lexicographically smallest bit position value into its word boundary register 52. At the end of the bit competition process, the CITO transmitters having a nonzero content remaining in their bit position registers compare the content of their bit position register 54 with the bit position value shifted into the word boundary register 52. In each CITO transmitter in which the two values are equal, the CITO transmitter will proceed to transmit the bits remaining in its data register 50. Otherwise, in those CITO transmitters where the content of the word boundary register 52 and the bit position register 54 are not equal, those CITO transmitters will remain silent until its word boundary register is again decremented to zero, at which time it will again participate in a bit competition process. This process of data-bit transmission interleaved with bit competition will continue until all of the data in the data registers of all of the CITO transmitters connected to the same line of the communication bus 10 is transmitted.

Returning now to FIG. 1, suppose each of the four Transmission Nodes 12, 14, 16 and 18 store in their respective data registers 50 one of the four different multi-bit data values shown on FIG. 4. In this example, data transformer 42 in each Transmission Node passes the multi-bit data received from the data source 48 directly to the CITO transmitter 20 without any transformation, data transformer 44 inverts the data values as shown in FIG. 4 and data transformer 46 in each Transmission Node transforms the data using the transformational bit string 010 as indicated. In the illustrated embodiment, the CITO transmitters 20 in each Transmission Node are connected to serial transmission line 26, CITO transmitters 22 in each Transmission Node are connected to serial transmission line 28, and CITO transmitters 24 in each Transmission Node are connected to serial transmission line 30.

In the following example, Transmission Node 12 is storing data value 000 for transmission, Transmission Node 14 is storing data value 010 for transmission, Transmission Node 16 is storing data value 101 for transmission, and Transmission Node 18 is storing data value 110 for transmission.

As previously indicated, each Transmission Node 12, 14, 16 and 18 will simultaneously transmit bit-by-bit its stored data value in its initial form, its inverted form and its transformed form on serial transmission lines 26, 28 and 30, respectively. Also, because of the CITO protocol described above, the transmission of the lexicographically smallest data value will be completed first on each of the serial transmission lines.

Returning to FIG. 4, the initial data value 000 will be successfully transmitted on serial transmission line 26 during the first iteration of the CITO protocol process. In a like manner, the inverted data value 001 will be successfully transmitted on serial transmission line 28 while transformed data value 000 will be successfully transmitted on serial transmission line 30. With the successful transmission of its data on at least one of the three serial transmission lines, the Transmission Nodes 12, 14 and 18 will terminate the transmission of that data value on all of the serial transmission lines and will not participate in any subsequent bit competition or transmission until the data value is to be transmitted. Transmission Node 14 will subsequently win the bit competition and transmit on line 28 its remaining two bits of its inverted data to complete the transmission of all the data. The Processor 30 will receive the data transmitted on each of the serial transmission lines 26, 28 and 30 of communication bus 10 and transform the received data back to their original or initial format using an inverse transformation.

The described autonomous activities of the CITO transmitters create a distributed transmission of data which has nearly perfect performance simultaneously in the three characteristics of multi access channels, throughput, delay and stability. Moreover, a communication system using CITO protocol has the unique property of automatic compression and the use of multiple CITO transmissions on parallel transmission lines of a computer communication bus results in automatic balancing of the transmission loads on each of the parallel transmission lines and leads to a fault-tolerant transmission system which has graceful degradation properties.

What is claimed is:

1. A computer communication bus system comprising:

- a communication bus having at least two parallel transmission lines; and
- a plurality of transmission nodes connected to said communication bus, each node of said plurality of transmission nodes comprising:
- a data source for providing multi-bit data to be transmitted on said communication bus;
- transformer means for transforming said multi-bit data into at least two different data encoded formats; and
- CITO transmitter means for transmitting said multibit data in a first of said at least two different encoded formats on a first of said at least two parallel transmission lines, and transmitting said multi-bit data in a second of said at least two different encoded formats on a second of said at least two transmission lines, said CITO transmitter means transmitting said first and said second encoded formats of said multi-bit data on said first and said second parallel transmission lines using CITO protocol.

2. The communication bus system of claim 1 wherein said transformer means transforms said multi-bit data so that said multi-bit data in said at least two different encoded formats will be transmitted by said CITO transmitter means in a different order.

3. The communication bus system of claim 2 wherein said multi-bit data comprises a series of binary bits having zero (0) values and finite (1) values, said at least two different encoded formats of said multi-bit data comprises a first encoded format in which the series of binary bits is identical to the series of data bits provided by said data source and a second encoded format in which the values of said binary bits provided by said data source are inverted such that all bits having a zero value are transformed to bits having a finite value and all bits having a finite value are transformed to bits having a zero value.

4. The communication bus system of claim 3 wherein said transformer means transforms said multi-bit data into at least a third encoded format different from said at least two different encoded formats.

5. The communication bus system of claim 4 wherein said transformer means has means for adding a reversible transformational bit string to said multi-bit data to generate said at least a third encoded format.

6. The communication bus system of claim 1 wherein said communication bus has a plurality of transmission lines, and wherein said transformer means comprises a plurality of data transformers equal in number to said first plurality of transmission lines.

7. The communication bus system of claim 6 wherein said CITO transmission means comprises a plurality of CITO transmitters, each CITO transmitter of said plurality of CITO transmitters being connected to a respective one of said plurality of transmission lines and an associated one of said plurality of data transformers.

8. The communication bus system of claim 7 wherein each of said CITO transmitters comprises:
data register means for storing multi-bit data; each data bit of said multi-bit data having one of two possible states;
word boundary register means for storing a number corresponding to the number of data bits in said multi-bit data;
bit position register means for storing a number corresponding to the number of bits in said multi-bit data;
first means for transmitting the data bits from said data register to said respective one of said plurality of transmission lines one bit at a time in serial fashion;
means responsive to said respective one of said plurality of transmission lines having a state which is the same as the state of said data bit being transmitted for enabling said first means for transmitting to transmit next data bit of said multi-bit data, said first means further including means for decrementing said word boundary register and said bit position register to signify said state of said transmitted data bit being transmitted the same as the state of said respective one of said first plurality of transmission lines;
means for disabling said first means for transmission in response to detecting a difference between said state of said data bit being transmitted and said state of said respective one of said plurality of transmission lines, said means for disabling further including means for only decrementing said word boundary register for each bit transmitted on said respective one of said plurality of transmission lines; and
bit competition means responsive to said word boundary register being decremented to zero for comparing said number of bits in said bit position register with said number of bits in said bit position registers in each CITO transmitter of said plurality of CITO transmitters to enable said first means for transmitting when said number of bits in said bit position register is indicative of the lexicographically smallest data word remaining to be transmitted.

9. The communication bus system of claim 1 wherein each transmission node of said plurality of transmission nodes further comprises receiver means for receiving said data being transmitted on said at least two parallel transmission, said receiver means including means for reconstructing said data being received using CITO protocol and means for transforming said received data to its original format.

10. The transmission system of claim 9 wherein said plurality of transmission nodes comprises a plurality of processors of a distributed multi processor network.

11. A communication bus system for a distributed processor system comprising:
a communication bus having at least two parallel transmission lines; and
at least two distributed processors connected to said communication bus for transmitting data thereon, each distributed processor of said at least two distributed processors having a CITO transmitter associated with each of said at least two parallel transmission lines, said CITO transmitters transmitting data on each of said transmission lines in accordance with a CITO protocol; each processor of said at least two distributed processors having means for generating data to be transmitted on said communication bus, and at least one data transformer associated with each CITO transmitter for encoding said data generated by said means for generating data to alter its transmission order when transmitted by said CITO transmitter in accordance with said CITO protocol.

12. A method for transmitting data by a plurality of transmission nodes on a communication bus having at least two transmission lines comprising the steps of:
transforming in each of said transmission nodes, the data to be transmitted to generate at least first encoded data and second encoded data different from said first encoded data;
transmitting by each of said transmission nodes on a first of said at least two transmission lines said first encoded data using CITO protocol; and
transmitting by each of said transmission nodes on a second of said at least two transmission lines, said second encoded data using CITO protocol.

* * * * *